June 13, 1933.   N. M. ERDAHL   1,913,706
BRAKE FOR POWER WINCHES
Filed Nov. 16, 1931   3 Sheets-Sheet 1
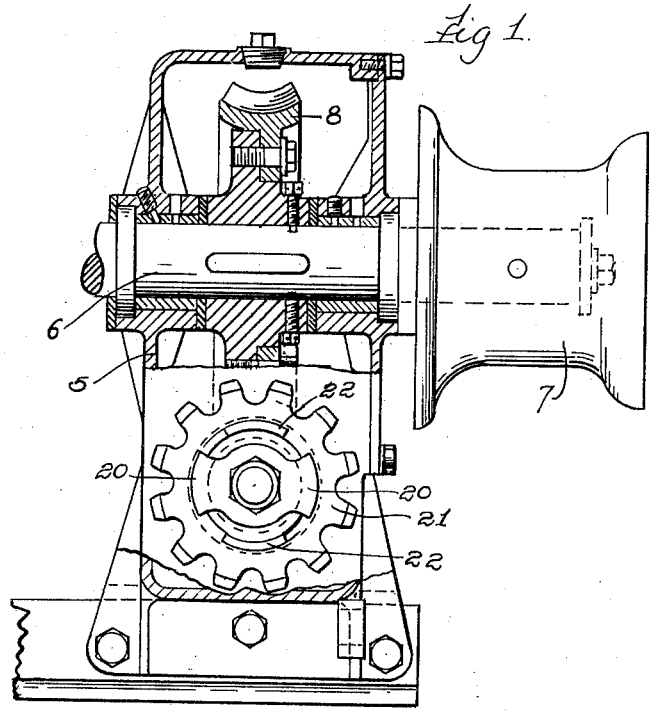
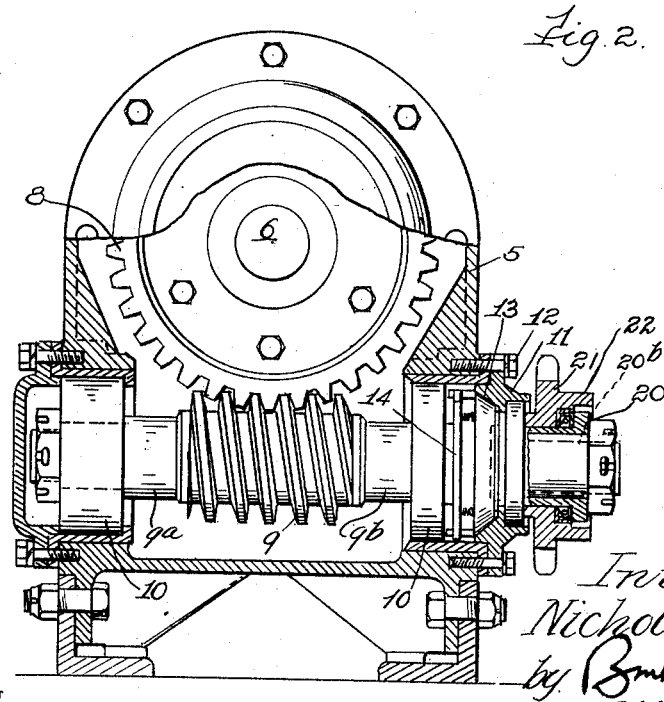

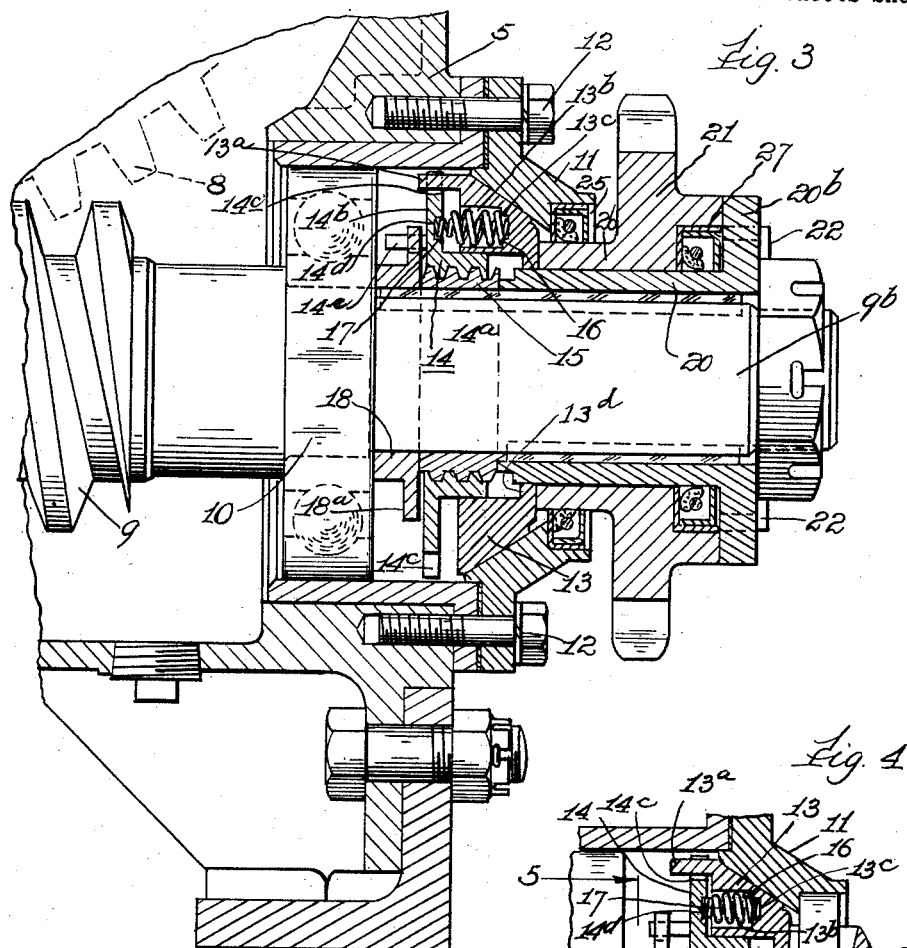

June 13, 1933.   N. M. ERDAHL   1,913,706
BRAKE FOR POWER WINCHES
Filed Nov. 16, 1931   3 Sheets-Sheet 3
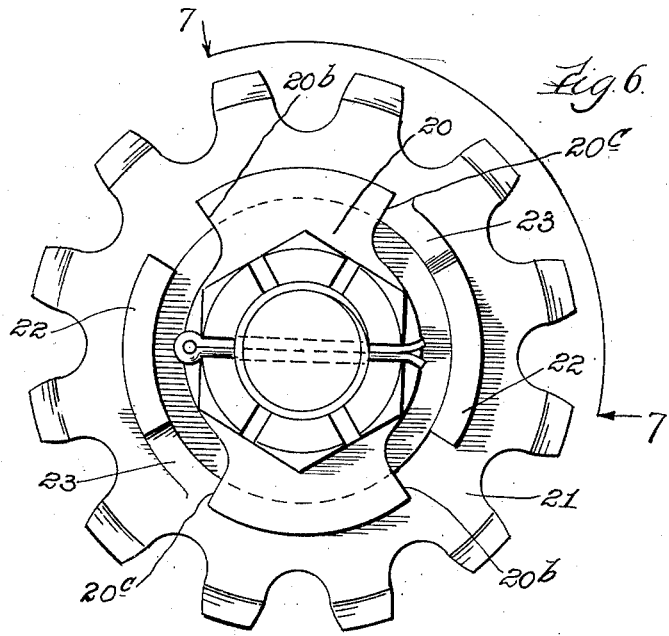
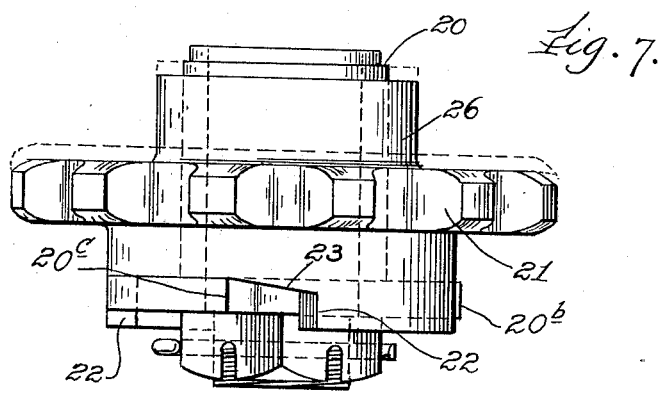
Inventor.
Nicholai M. Erdahl.
by Bowen & Bowen
his Attorneys.

Patented June 13, 1933

1,913,706

UNITED STATES PATENT OFFICE

NICHOLAI M. ERDAHL, OF EDGERTON, WISCONSIN, ASSIGNOR TO HIGHWAY TRAILER COMPANY, OF EDGERTON, WISCONSIN, A CORPORATION OF WISCONSIN

BRAKE FOR POWER WINCHES

Application filed November 16, 1931. Serial No. 575,187.

The present invention relates broadly to brake mechanisms, and more particularly to a brake mechanism of the type adapted to be automatically actuated for opposing or preventing reverse rotation of a driving element such as a shaft associated with the power transmission of an elevator, conveyor, hoist,—or as shown, a winch mechanism.

The purpose of this invention is to provide an improved mechanism of the character indicated which is adapted to be promptly and effectively operated, as for example, when the power drive or transmission mechanism accidentally becomes broken or for some reason rendered inoperative. The invention is further characterized by the provision of a novel construction wherein the driving element on the shaft with which the brake mechanism is associated is arranged for positively rendering the brake mechanism inoperative when said driving element is operated to drive the mechanism intentionally in reverse direction. It consists in certain novel features and elements of construction in combination, as herein shown and described, and as indicated by the claims.

In the drawings:—

Figure 1 is a view in elevation, with parts shown in section, of a winch mechanism with which is associated brake mechanism embodying the present invention.

Figure 2 is a transverse section through the winch mechanism; taken axially of the drive shaft, on which the brake mechanism is mounted.

Figure 3 is a fragmentary, enlarged sectional view of the brake mechanism, in normal or released position; taken at line, 3—3, on Figure 5.

Figure 4 is a sectional view similar to Figure 3, showing the brake elements in operative or applied position.

Figure 5 is a transaxial section taken at line, 5—5, on Figure 4.

Figure 6 is a face view of the driving sprocket and hub.

Figure 7 is an edge view of the driving sprocket and hub, looking in the direction indicated by arrows, 7—7 on Figure 6.

By way of illustration, the brake mechanism embodying the present invention is shown in the drawings in association with driving mechanism for a winch. Referring now in detail to the drawings, the housing for the winch driving mechanism is indicated at 5, in which is journaled a shaft, 6, both ends of which project laterally thereof. Rigidly secured on one extension on the shaft, 6, is a conventional type of drum or "niggerhead" indicated at 7; the other end of said shaft projecting beyond the housing may be arranged to carry a cable drum or other piece of apparatus, and it may be also understood that the device need not necessarily be constructed with said extension of the shaft. Keyed on the shaft, 6, in the housing is a worm gear, 8, which operatively meshes with a driving worm indicated at 9, the ends of which are reduced to form stub shafts, $9^a$ and $9^b$, which are journaled in roller bearings, 10, mounted in the housing, 5, as seen in the drawings. It has been generally recognized in engineering practice that it is undesirable to employ small pitch cast worm gearing for mechanism such as winches, and it will therefore be manifest that should a coarse or steep pitch gearing be employed there is a strong possibility of the worm being driven by the load in reverse direction when the application of power is discontinued. Therefore, in order to prevent such reverse rotation and still have the advantage of a coarse or steep pitch gearing of the type above indicated, it is necessary to provide some sort of mechanism which is arranged to automatically oppose and prevent such rotation, while also being arranged for automatically releasing itself when the gearing is again driven by power in its normal direction.

As may be seen in the drawings, the stub shaft, $9^b$, is of substantial length and on this portion of the shaft there is provided brake mechanism embodying my invention. The brake mechanism includes a fixed or stationary brake element, 11, secured by means of cap screws, 12, to the housing, 5, concentrically with respect to the shaft, 9, and a cooperating rotatable brake element, 13, which is normally maintained with its braking surface in frictional contact with the surface of the stationary element, 11. The brake element, 13, is formed with an annular hub portion having a telescopic sliding fit on a hub portion, 14ª, of a threaded follower element, 14, which co-operates with a threaded section, 15, keyed to the stub portion, 9ᵇ, of the shaft, 9, as seen in Figure 3. This follower element is provided with an annular flange, 14ᵇ, formed with a plurality of peripheral slots, 14ᶜ, which are herein shown as four in number, and in which are slidably engaged the laterally projecting lugs, 13ª, of the rotatable brake element, 13. By virtue of these connections the follower element and rotatable brake element are positively rotated together as a unit, but are permitted axial movement relatively to each other.

Pocketed in recesses, 13ᵇ, formed in the rotatable brake element are coil springs, 16, which serve to yieldingly apply the effective force in urging the rotatable brake element tightly against the stationary brake element, 11, for positively opposing or preventing reverse rotation of the shaft, 9. Arranged within each of the coil springs, 16, is another coil spring, 17, of smaller diameter and of considerably lighter tension, the opposite ends of which are pocketed in recesses, 14ᵈ, formed in the adjacent face of the flange, 14ᵇ, of the follower member, 14, and recess, 13ᶜ, in the brake element 13. It will be understood that in the normal direction of rotation of the shaft, 9, the follower element and the rotatable brake element, 13, are axially separated at their maximum limit, as seen in Figure 3, in which position the follower element is out of contact with the heavy coil spring, 16, but the light coil spring, 17, is just tensioned sufficiently to hold the braking surface of the rotatable element, 13, lightly against the co-operating surface of the stationary brake element, 11, and create a slight frictional drag. Projecting laterally from the flange, 14ᵇ, of the follower element at the side opposite the brake elements are a pair of diametrically opposite driving lugs, 14ᵉ, which are adapted to be engaged and driven by a pair of radially projecting lugs, 18ª, of a driving collar, 18, which is keyed on the stub portion, 9ᵇ, of the shaft intermediate the worm section, 15, and the adjacent roller bearing, 10.

Rigidly keyed to the outer end of the stub portion, 9ᵇ, of the shaft is a driving hub, 20, the inner end of which abuts against the worm section, 15. Supported on the driving hub and arranged for limited rotation thereon is the driving element herein shown as a sprocket wheel, 21, which may be understood to be driven by an endless chain (not shown) from a convenient source of power such as a power take-off from the transmission of an automotive vehicle. This sprocket wheel, as may be seen in Figures 3, 6 and 7, is formed with two diametrically opposite driving lugs or jaws, 22, the corresponding ends of which lugs are adapted to engage the adjacent faces, 20ᵇ, of the driving jaws, formed on the outer end of the driving hub, 20, when said sprocket rotates in its normal direction to drive the shaft, 9.

The opposite end of each jaw, 22, is formed to be engaged by the face, 20ᶜ, of one of the jaws of the hub, 20, when the drive sprocket, 21, is positively driven in reverse direction. Leading up to these effective driving ends of the jaws, 22, on the sprocket, 21, are inclined cams or wedges, 23, which serve to positively shift and maintain the brake elements, 11 and 13, in inoperative position, as will be hereinafter more particularly described.

It will be understood that the construction herein shown is such that the brake mechanism is always operating in an oil bath which seeps through from the main reservoir in the bottom of the worm gear housing, and thus eliminates the necessity of any special attention to lubrication. To provide against foreign matter coming in contact with the operating members of the brake mechanism, and also for keeping the journaled surfaces free and protected, there is mounted at the end of the stationary brake member, 11, an oil seal indicated at 25, which surrounds the inwardly extending hub portion, 26, of the sprocket, 21, the end of which in normal driving position is in contact with an inwardly projecting annular flange, 13ᵈ, of the rotatable brake element, 13. There is also provided an oil seal, 27, between the outer end of the sprocket and the driving hub, 20.

The operation of the brake is substantially as follows:

When the driving sprocket is rotated in normal direction, the follower, 14, is disposed at the innermost end of the threaded portion, 15, as seen in Figure 3, at which position the small coil springs, 17, exert sufficient force against the rotatable brake element, 13, to yieldingly maintain its braking surface in frictional contact with the braking surface of the stationary element, 11. Now when the drive to the sprocket, 21, is interrupted, as by the chain breaking or from any other cause the reverse rotation of the shaft, 9, is at once opposed by the action of the load working through the worm gearing to forcibly urge the rotatable brake element, 13, tightly against the stationary element, 11. It will be noted that the driving connections between the follower member, 14, and the collar, 18, which consist of lugs, 14ᵉ and 18ª, disposed in diametrically opposite relation, involve a lost motion effect, since it will be manifest that just as soon as the shaft, 9, commences to rotate in reverse direction the driving lugs, 18ª, of the collar, 18, move out of contact with the driving lugs 14ᶜ, of the follower, until they come into contact with the opposite lugs, 14ᵉ, as seen in Figure 5. During this period of lost motion caused by reverse rotation of the shaft, it will be apparent that rotation of the threaded section, 15, will thread the follower in outward direction, compressing the coil springs, 17, and as the follower, 14, approaches its outermost limit, it comes in contact with the large coil springs, 16, and yieldingly but effectively imparts pressure to the rotatable brake element, 13, urging its braking surface into contact with the braking surface of the stationary element, 11, as seen in Figure 4, for opposing rotation of the shaft, 9. It will be understood that the small coil springs, 17, exert just sufficient pressure on the rotatable brake element, 13, to maintain a slight frictional drag between the rotatable brake element and the stationary brake element at all times during normal rotation of the shaft, 9.

Now when the shaft, 6, is again rotated in normal direction the driving lugs, 18ª, of the collar, 18, must again travel through approximately one-half revolution before they pick up or come in driving contact with the lugs, 14ᶜ, of the follower for rotating it, and because the springs, 16 and 17, are under heavy compression tending to forcibly urge the follower, 14, and rotatable brake element, 13, axially apart, it will be manifest that during this interim the rotation of the threaded worm section, 15, will positively thread the follower member, 14, inwardly away from the rotatable brake element, 13, so as to relieve the pressure on the rotatable brake element until it is only under influence of the springs, 17, permitting said brake element, 13, to be rotated with the follower member and the shaft, 9, as before.

In the event that it is desired to positively drive the shaft, 9, in reverse direction, as is necessary in many instances, it will be seen from Figure 6, that the cam surface, 23, on the outer face of the sprocket will immediately wedge underneath the adjacent driving lug or jaw, 20ᵇ, of the driving hub, 20, and in so doing the sprocket, 21, is caused to be shifted axially and inwardly on the driving hub, 20, so that the end of its hub portion, 26, which engages the annular flange, 13ᵈ, of the rotatable brake element, 13, positively shifts the rotatable brake element, 13, out of contact with the stationary element, 11. This is accomplished just prior to the time when the end of the driving lug, 22, which adjoins the cam surface, engages the adjacent end of the driving lug, 20ᵇ, of the driving hub, 20, for positively driving the shaft, 9, in reverse direction. Of course upon again driving the shaft in the original direction the tension of the springs, 17, will be adequate for urging the rotatable brake element into normal position for slight frictional contact with the stationary element, 11, while the sprocket, 21, will naturally move axially in outward direction, thus returning to its normal position.

Although I have shown and described herein a certain specific construction embodying the invention, it will be manifest to those skilled in the art that various modifications and rearrangements of the parts may be made without departing from the spirit and the scope of the invention, and that the same is not limited to the particular form herein shown and described, except in so far as indicated by the appended claims.

I claim:—

1. In a load hoisting apparatus, in combination, a supporting structure, a power shaft supported therein connected so as to be rotated by the descent of the load, a braking member positively mounted in fixed position in the frame structure; a cooperating brake element associated with the shaft for rotation thereby and movable therealong; spring means reacting on said movable brake element for stressing it against the fixed brake member; a part mounted on the shaft and suitably extended for taking directly the opposite reaction of said spring means and for rotative engagement with the movable brake element, said part having screw-thread engagement with the shaft, and means carried positively by the shaft in its rotation arranged with respect to said reaction-taking part for rotative connection therewith with angular lost motion between said shaft-carried means and said reaction-taking part, whereby the rotation of the shaft in one direction through its angular lost motion range operates to screw the follower along the shaft in the direction for relaxing the reaction of the spring means for stressing the movable brake element against the fixed brake member and its rotation of the shaft in the opposite direction increases said reaction and stress.

2. In a load hoisting apparatus, in combination with supporting structure, a power shaft supported therein and arranged for connection with the hoisting means so as to be rotated by the descent of the load; a journal bearing for the shaft in the frame structure from which journal bearing the shaft extends at one side for connection with the load hoisting means and at the other side for carrying a means connecting it with power; a brake member carried positively in fixed position on the frame structure encompassing the shaft between said shaft journal bearing and the power-connecting means on the shaft; a cooperating brake element loosely encompassing the shaft adjacent to said fixed brake member and between the latter and the shaft journal bearing; spring means reacting on said cooperating brake element for stressing it against the fixed brake member; a follower element supported on the shaft for taking the opposite reaction of said spring means and engaged with said cooperating brake element for rotation, the shaft and said follower member having cooperating abutments for rotation of the follower member by the shaft with an angular range of lost motion in said rotation, the means of engagement between the shaft and the follower member at the mounting of the follower on the shaft being suitable for camming the follower along the shaft in the rotation of the shaft through said angular lost motion range.

3. The construction defined in claim 2, the camming engagement between the shaft and the follower member being formed for camming the follower in the direction for stressing the movable brake element against the fixed brake member in the rotation of the shaft in load-lowering direction, and in the direction for relaxing the stress in the rotation of the shaft in load-hoisting direction.

4. The construction defined in claim 2, the follower member being a collar having a screw thread engagement with the shaft and having a transaxial annular flange extending radially for facing the movable brake element, said flange and brake element having cooperating projections and apertures circumferentially distributed about the axis of the shaft for rotative engagement of said elements with each other for deriving through the follower rotative movement of the brake element from the rotation of the shaft.

5. The construction defined in claim 2, the shaft having fast on it adjacent the follower member a collar having a radially projecting lug, and the follower member having a paraxially projecting lug at radial distance from the axis of the shaft for encounter of said radial lug in the rotation of the shaft in one direction, whereby there is effected lost motion between the shaft and the follower through a predetermined angular range in the rotation of the shaft in the opposite direction, the follower having screw threaded engagement with the shaft at its mounting thereon, the pitch of the screw thread being such as to cause the follower to be screwed along the shaft in the direction for stressing the movable brake element against the fixed brake member in the rotation of the shaft through the lost motion range in the reverse of load-hoisting direction.

6. In a load hoisting apparatus, in combination with a supporting structure and a power shaft supported thereon, and load hoisting means operatively associated therewith for hoisting by rotation of the shaft in one direction, a brake member positively carried fixedly on the supporting structure; a cooperating brake element carried on the shaft, and means engaging said brake element with the shaft for rotation thereby, said element being movable along the shaft toward and from the fixed brake member, and spring means associated with the shaft and said brake element for yieldingly stressing the latter toward the positively carried and fixed brake member; a power wheel on the shaft arranged for driving connection with a power source, said power wheel being loose on the shaft, a clutch collar fast on the shaft for rotation therewith, said wheel and clutch collar being cooperatively formed for mutual engagement for rotation with an angular range of lost motion between them, the wheel having its hub extended along the shaft from the side opposite the clutch collar into thrust engagement with the movable brake element in the direction for thrusting the latter away from the fixed brake member; whereby the spring reacting on said movable brake element for stressing said element against the fixed brake member operates to stress the power wheel toward the clutch collar, said wheel and collar being formed with cooperating faces, one of which has a cam slope located for camming the wheel toward the brake element in the lost motion phase of the rotation of the wheel in one direction, whereby rotation of the wheel in that direction operates to disengage the brake before rotation of the wheel is communicated to the clutch collar and shaft.

7. The construction defined in claim 6, the means for lost motion and camming between the power wheel and the clutch collar consisting in that the power wheel has its hub at the opposite side from that which is thrust against the brake element cut away at diametrically opposite arcuate portions forming recesses with a cam slope at the bottom of the corresponding end portions of the bottoms of the respective recesses, and the clutch being fast on the shaft and provided with radially opposite projections engaging said recesses respectively, the arcuate width of said projections being not greater than the arcuate extent of the recesses less the extent of the cam slopes.

8. In combination with a supporting structure and a power shaft supported therein and work-performing means operatively associated therewith, a brake member positively carried fixedly by the supporting structure; a cooperating brake element carried on the shaft; means engaging said brake element with the shaft for rotation thereby, the brake element being movable along the shaft and spring means yieldingly stressing it against the fixed brake member; a power wheel loose on the shaft having its hub extending into thrust engagement with the movable brake element; a clutch member fast on the shaft for rotation therewith at the opposite side of the power wheel from said brake element, the power wheel and clutch member being cooperatively formed for rotative engagement of the power wheel with the clutch member with a limited angular range of lost motion, one of said parts having within said lost motion range a paraxially protruding cam arranged to cooperate with the other of said parts for camming the power wheel toward the movable brake element when the power wheel is rotated in one direction, and releasing it for yielding to the stress of the brake element spring when the power wheel is rotated in the opposite direction.

NICHOLAI M. ERDAHL.